(12) United States Patent
Haardt et al.

(10) Patent No.: US 7,769,022 B2
(45) Date of Patent: Aug. 3, 2010

(54) SYSTEM AND PROCESS FOR QOS-BASED PACKET SCHEDULING

(75) Inventors: Celine Haardt, Bouloc (FR); Nicolas Courville, München (DE)

(73) Assignees: Alcatel Lucent, Paris (FR); Deutsches Zentrum fur Luft-und-Raumfahrt-DLR, Wessling (DE)

( * ) Notice: Subject to any disclaimer, the term of this patent is extended or adjusted under 35 U.S.C. 154(b) by 323 days.

(21) Appl. No.: 11/836,101

(22) Filed: Aug. 8, 2007

(65) Prior Publication Data

US 2008/0037549 A1 Feb. 14, 2008

(30) Foreign Application Priority Data

Aug. 9, 2006 (EP) .................................. 06291290

(51) Int. Cl.
*H04L 12/28* (2006.01)
*H04L 12/56* (2006.01)
*G01R 31/08* (2006.01)

(52) U.S. Cl. ............... 370/395.21; 370/389; 370/395.4; 370/412; 370/229

(58) Field of Classification Search ........................ None
See application file for complete search history.

(56) References Cited

U.S. PATENT DOCUMENTS

| | | | |
|---|---|---|---|
| 5,247,677 A | 9/1993 | Welland et al. | |
| 6,438,106 B1 * | 8/2002 | Pillar et al. ................. | 370/232 |
| 6,466,984 B1 | 10/2002 | Naveh et al. | |
| 2002/0075875 A1 | 6/2002 | Dravida et al. | |
| 2004/0264500 A1 * | 12/2004 | Bansal et al. ............... | 370/468 |
| 2005/0160180 A1 | 7/2005 | Rabje et al. | |
| 2006/0056432 A1 * | 3/2006 | Azarov ....................... | 370/412 |

FOREIGN PATENT DOCUMENTS

EP 1283625 A1 2/2003

* cited by examiner

*Primary Examiner*—Hong Cho
*Assistant Examiner*—Hicham B Foud
(74) *Attorney, Agent, or Firm*—Fay Sharpe LLP

(57) ABSTRACT

A system for scheduling the attribution of hardware output resources to data packets handled by different service providers is provided. The system includes an extraction device which extracts a Quality of Service parameter included in a packet header; a random value generator; a programmable key attribution device attributing a priority key to a packet depending on the Quality of Service parameter and on the generated random value, according to programmable rules; a scheduling device that includes a command generator generating packet switching commands in an order depending on the value of the priority key attributed to each packet header; and a switching device routing the packets towards hardware output resources in the order of the generated packet switching commands.

11 Claims, 3 Drawing Sheets

|  | | K | | | |
|---|---|---|---|---|---|
|  | | 0 | 1 | 2 | 3 |
| PROV 0 | QoS 0 | 1 | 0 | 0 | 0 |
|  | QoS 1 | 0 | 1 | 0 | 0 |
| PROV 1 | QoS 0 | 7/8 | 0 | 1/8 | 0 |
|  | QoS 1 | 0 | 6/8 | 0 | 2/8 |

SYSTEM AND PROCESS FOR QOS-BASED PACKET SCHEDULING

This application claims priority from European Patent Office application 06291290.2, filed on 9 Aug. 2006.

BACKGROUND

The invention relates generally to the field of telecommunication. Specifically, the invention relates to the management of the Quality of Service (QoS) and service provider for telecommunication packet-based systems like packet switch or internet router.

The role of telecommunication packet-based systems is to route incoming data packets to system outputs. In case of satellite embedded packet switch, the output resources are the down link beams, used in Time and/or Frequency division multiplex modes. Each packet is supposed to have constant duration, called "time slot". A packet based system can either handle packets individually or as bursts. A burst is considered as a group of consecutive incoming packets having common header characteristics (same destination and QoS for example).

In packet-based systems, the instantaneous data packet rate at each system output is statistical and has to be limited to the output capacity when output congestion occurs. To build the data packet flow at each system output, it has to be decided first which packet can be allocated to the output or not. For packets that are not immediately allocated to the output, they can be buffered (and allocated later), and if the buffer is full, these data packets can be dropped. All of these decisions are called packet scheduling. The information required to achieve packet scheduling is located in Packet Header (PH) of data packet, classically (eg: IP, ATM) the output destination, the Quality of Service (QoS), the duration, the bandwidth, the provider membership can be directly read or indirectly deduced (via mapping tables) from the PH content.

An important topic for multi-service integration into next generation of telecommunication packet-based systems is to take into account the management of network QoS and service provider while scheduling packets. Various types of Internet applications require different packets scheduling profiles: for example, Voice over IP (VoIP) or video streaming applications bear losses (drop) but are time sensitive (few or no buffering) while an e-mail could support delay (buffering) but very few losses. There is no general standard for these scheduling profiles, they can vary with the type of network, with the transport layer, with the service provider requirements, and with the network evolution.

Two models exist for supporting Quality of Service in the future Internet: Integrated services (Intserv) and Differentiated services (Diffserv). Integrated services require a substantial amount of complexity to manage the large packet-based systems (like tens thousands of connected users). Differentiated services move the complexity to the edges of the network (i.e the terminals in satellite systems) and make the switch more scalable. Simple Differentiated services algorithms provide only rudimentary QoS hierarchy, the other ones are considered as too complex for space application. Moreover, simple Differentiated services algorithms usually suffer from unfairness during congestion (an important criterion to service provider) allowing high priority packets to block completely lower priority ones.

In addition, there is a growing demand for switching systems shared by several communication service providers. It means that the packet scheduling processes should take into account the fact that the output resources have to be shared among different providers. The output resources attribution rules should be fairly defined according to the financial contribution of each service providers. A classical satellite system distributes its output resources among different providers under a static and strict scheme. In this way, the negotiated bandwidth is permanently guaranteed, but the global system performance is not optimal compared to a system where down link resources are fully shared among providers. Indeed, in case of a "strict provider resource partition" and inside a given output, the sum of all probability to have a congestion inside each provider resource portion is higher than the probability to have a congestion inside this given output while ignoring the provider output partitioning. Moreover, a classical packet switching system based on "per provider queues" is highly dependent on the partitioning definition: the number of queues are frozen at the time of the design. Then, commercial exploitation could be limited due to this design constraint. This problem is more particularly acute for satellites since they remain several years in orbit without design modifications possibilities, and where the number of "per provider queues" can not be necessary sized at the maximum.

A need exists then, for providing a system and a process that solve these drawbacks.

SUMMARY

The aforementioned needs are satisfied at least in part by a system for scheduling the attribution of hardware output resources to data packets handled by different service providers and to be transmitted, the system comprising:
  an extraction device adapted for extracting a Quality of Service parameter included in a packet header;
  a random value generator;
  a programmable key attribution device attributing a priority key to a packet depending on the Quality of Service parameter and on the generated random value, according to programmable rules;
  a scheduling device comprising a command generator generating packet switching commands in an order depending on the value of the priority key attributed to each packet header;
  a switching device routing the packets towards hardware output resources in the order of the generated packet switching commands.

According to another aspect:
  the system comprises means for determining a capacity overflow for each service provider;
  wherein the scheduling device firstly generates packet output commands for packets for which a service provider capacity output overflow is not detected, and secondly generates packet output commands for the packets for which an overflow is detected in the limit of the hardware output resources.

According to another aspect:
  the scheduling device comprises different queues related to different respective priority keys, a packet header sorter storing a packet header in the queue corresponding to its attributed priority key;
  the command generator operates consecutive sub processes, each sub process scanning the packet queues in a programmable sequence and picking header packets out of the scanned queue depending on a matching condition that depends on the sub process operated.

According to another aspect,
  said sub processes comprise a sub process generating said packet output commands for packets for which a service provider capacity output overflow is not detected, and a sub process generating said packet output commands for the packets for which an overflow is detected in the limit of the hardware output resources.

According to another aspect:

said sub processes comprise a sub process generating said packet output commands, a sub process generating packet dropping commands, a sub process generating packet buffering commands;

the switching device comprises a buffer memory storing the packets and a switch adapted to be connected to hardware output resources, the switching device routing a packet towards the hardware output resources when it receives said related packet output command, deleting a packet from the buffer memory when it receives a related packet dropping command, and maintaining a packet in the buffer memory when it receives a related packet buffering command.

According to another aspect, said successive sub processes are repeated for each packet time slot.

According to another aspect, the extraction device is adapted for extracting, from a packet header, characteristics chosen in the group constituted of the service provider identification, the bandwidth of the channel used for sending the packet, the packet size; the packet destination address, the packet origin address, the packet required arrival time, the available transmission bandwidth for the packet service provider, the kind of data included in the packet and a multicast parameter;

the programmable key attribution device also attributes said priority key depending on said chosen characteristics.

According to another aspect the key attribution device includes a random access memory storing the key attribution rules.

The invention also proposes a method for scheduling the attribution of hardware output resources belonging to a system, to data packets handled by different service providers and to be transmitted, comprising the steps of:

programming rules for attributing a priority key to a packet depending on a Quality of service parameter and on a random value;

for several packets:

extracting from a packet header a Quality of Service parameter;

attributing a priority key to said packet according to the programmed rules;

routing the packets towards hardware output resources in an order depending on the value of the priority key attributed to their respective header.

According to another aspect: it comprises the steps of:

further to the extraction of a service provider identification, detecting for each packet if there is a service provider capacity overflow;

firstly routing the packets for which no service provider capacity overflow was detected towards hardware output resources;

secondly routing the packets for which an overflow was detected towards hardware output resources in the limit of these hardware output resources.

According to another aspect, said steps are repeated for each packet time slot.

DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION

Figure 1:
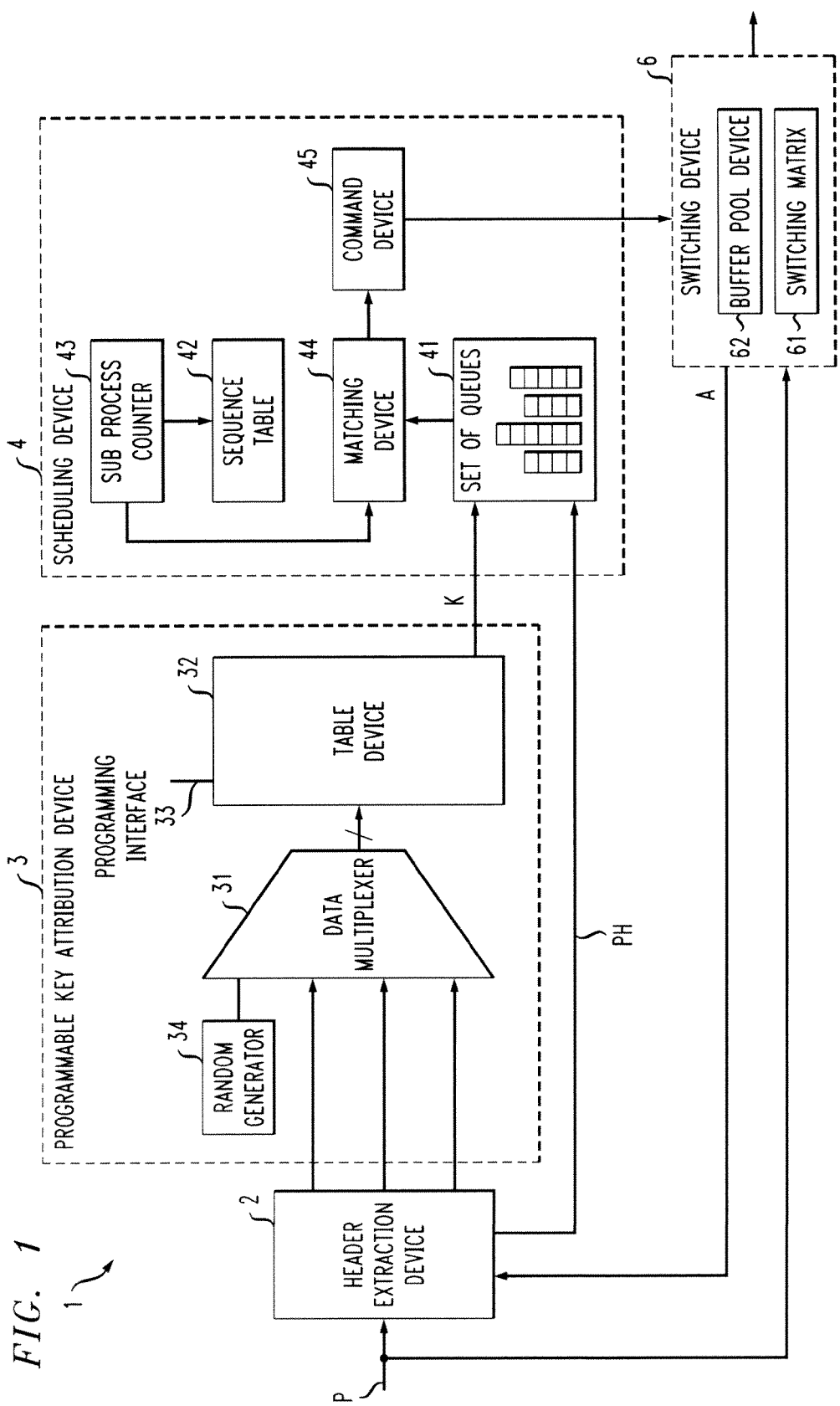
FIG. 1 schematically illustrates a system according to an embodiment of the invention.

The main idea is to propose a new packet hardware attribution scheduling based on a generic key K, computed taking into account the packet header fields (such as network QoS, bandwidth, burst duration, etc . . . ) and a randomised value Rd. A scheduling device comprises a command generator, which notably generates packet switching commands in an order depending on the value of the priority key attributed to each packet header. A switching device then routes the packets towards hardware output resources in the order of the generated packet switching commands.

Within this idea, a weighted function K=H(packet_header_fields+Rd) may be implemented thanks to a transition table containing all possible value of K. Each value of K (varying from $(K_i)_{min}$ to $(K_i)_{max}$) being possibly addressed several times in the table. To compute K, the value [packet_header_fields+Rd] addresses the table content and the corresponding table entry value gives K. If the packet scheduling profile changes, the transition table content is easily reloaded.

The use of randomised values Rd while addressing the table is justified for network QoS fairness, it is used to "modulate" network QoS prioritisation: an appropriate table content allows a packet with a low priority QoS to be served "sometime" before a packet having a high priority, with the given probability $x_{QoS}$ activated by the random variable Rd. The probability $x_{QoS}$, implicitly programmed in the Transition table, is in fact the QoS fairness level, and then it is then easily programmable.

The packet headers may be stored in queues (one queue per K value). The set of queues may then be scanned under various sequences of K depending on the scheduling operation steps, picking out specific packets (via a matching condition) inside the K-queues.

Once $K_i$ is computed, the packet scheduling device may deal with a set of packets queues, each queue corresponding to a given value $K_i$. The interest is that packet scheduler processes can be broken down into sub-processes Ω, having in common queue-scanning operations and a matching condition M(Ω) to pick out or not a packet from the queue. Depending of the sub-process Ω, various scanning orders of $\{K_i\}$ are defined, also called sequences $S^\Omega$ where $(K_j)_{j=S^\Omega(i_{min} \ldots i_{max})}$. For sub-processes concerning hardware output resources attribution, a sequence $S^{output\_attribution}$ is defined. For sub-processes concerning packet dropping, $S^{dropping}$ is defined, etc . . . depending scheduling needs.

Independently, the invention proposes to handle overflows for each service provider. In particular, provider fairness management is enabled by 2 consecutives sub-processes $\Omega_1 \& \Omega_2$, having the same sequence $S^{output\_attribution}$ during $\Omega_1$ the matching condition $M(\Omega_1)$ is that each packet of a given service provider and going to a given output has up to its negotiated resource capacity per output at its disposal (classical strict allocation scheme), while the second matching condition $M(\Omega_2)$ is that each packet going to a given output has up to the related output resource capacity at its disposal while servicing all un-served data packets from any provider.

Transition table content, sequence tables can be easily programmed in RAM-based containers, the packet scheduler design is not dependent on the system and network configuration scheme and then it is scalable, even during commercial operation. Uncertain market direction and speed of adaptation will also favour such agile technologies.

The present invention gathers the advantages of Differentiated services, offering QoS fairness even at high load when congestion often occurs, including on-board scalability when scheduling profile change and with few processing complexity compared to existing fair Differentiated services algorithms that involve complex active queue management mechanisms. It also keeps the user terminal simple, because complexity is not "pushed" to the network edge equipment. The present invention may also guarantee the negotiated bandwidth per provider under an unlimited and scaleable partitioning scheme, while increasing global system performance compared to a static and strict output resource partitioning situation.

An example of a system 1 embodying the invention is best illustrated with reference to FIG. 1. This system 1 comprises a header extraction device 2, a programmable key attribution device 3, and a scheduling device 4 comprising a command device 45. Packets P are physically stored, switched or dropped by the switching device 6 and can be identified by a specific pointer A carried by to packet header PH. The PH are propagated through devices 3, 4. The scheduling device 4 computes the packet scheduling decisions done from the packet header PH. The command device 45 translates the scheduling decisions done on PH into commands compatible with the connected switching device 6. The switching device 6 is adapted for physically switching in switching matrix 61, buffering in buffer pool 62 or dropping packets P according to the commands sent by the command device 45, each packet P being associated to a packet header PH, and identified by the pointer A.

The extraction device 2 is adapted for receiving a packet header PH, and retrieving from it notably a service provider identification, a Quality of Service parameter, the packet channel bandwidth, the packet destination address. The extraction device 2 may also extract additional data from the packet header, like the burst duration for burst management, the packet origin address, the packet required arrival time, the available transmission bandwidth for the packet service provider extracted, the related of data included in the packet or a multicast parameter. Any packet header data that might be useful for scheduling the packet treatment could be extracted by device 2.

The programmable key attribution device 3 receives the extracted header data and concatenates it with a randomised data generated by a random generator 34. The device 3 attributes according to programmable rules, a priority key K to the corresponding packet (or burst in case of burst management) depending on the extracted data and the random value. The key attribution device 3 may comprise a data multiplexer 31 and a table device 32, provided with a programming interface 33. The multiplexer 31 is connected to device 2 and to the random generator 34 in order to receive each kind of data on a separate entry. The data multiplexer 31 output is provided on an entry of the table device 32. Depending on the data multiplexer 31 output value, a priority K is attributed to the packet according to key attribution rules previously stored in the table device 32. The programming interface 33 may be used in order to change the stored rules of table device 32.

Said key attribution rules may be stored in a random access memory, which can be easily programmed and integrated into a complete hardware design like an Application Specific Integrated Circuit. For satellite applications, attribution rules and sequences can either be programmed onboard or programmed through radiofrequency commands emitted from a ground station. The attribution rules and sequences programmed could be static or dynamic. The method to compute the attribution rules and sequences mostly depends on the traffic conditions measured or planned, the performance expected per Quality of Service, and possibility the instantaneous switch buffer states. In case of dynamic refreshing of the attribution rules and sequences (with a period about or higher than the second), the scheduler is considered as adaptative with the traffic condition.

The attributed priority key K, coupled with the corresponding packet header PH are provided on an entry of the scheduling device 4.

The scheduling device 4 operates a set of packet scheduling sub processes which ultimate goal is to optimally route the packets towards output of the switching device 6 directly via switch matrix 61 or in a postponed way after buffering in buffer pool 62. The consecutive sub processes of the scheduling device 4 are indexed by a sub processes counter 43. During one time slot, the set of sub processes is fully played, and the sub processes counter 43 is reset at every beginning of time slot. Incoming packet headers PH are stored in queues 41, in a chronological order. There is one queue per priority key K value, so PH are stored in the queue corresponding to their associated key K. Thus, there is a K-based sorting of the packets in the scheduling device 4. Each sub process operated in the scheduling device 4, scans the set of queues 41 in an order defined in a given sequence table 42. The content of the sequence table may vary, and is addressed by the sub process counter 43. Inside a queue (then for a given value of K), the packet headers PH are read starting from the first to the last arrived way. The decision to pick up a PH from the queue or not is given by the matching device 44. The matching decision may vary, and is addressed by the sub process counter 43. When a PH is matched, it is tagged with a status that corresponds to the current sub process given by the sub process counter 43.

If the current sub process corresponds to an output attribution decision and the PH is matched, PH leaves the queue and the switching device 6 routes the corresponding packet P to the switch output, its related pointer address A is deallocated; if the corresponding packet P is located in buffer pool 62, the buffer place is also deallocated.

If the current sub process corresponds to a dropping decision and the PH is matched, PH leaves the queue and its related pointer address A is deallocated; if the corresponding packet P is located in buffer pool 62, the buffer place is also deallocated, packet P will never be switched through switching matrix 61.

If the current sub process corresponds to a buffering decision and the PH is matched, the switching device 6 routes the corresponding packet P to the buffer pool device 62 and the PH stays inside the same queue for further scheduling.

The 2 matching decisions associated with the output attribution sub processes required for provider fairness management involves a set of counters $C^1_{i,j}$ managed at each output i and per provider j, and a set of counter $C^2_i$ managed at each output i. During the 2 output attribution sub processes, each of these counters are incremented with the corresponding packet bandwidth given by the packet header PH, they are reset every time slot. For each packet header PH going to output i and belonging to provider j, the first matching condition is to have a counter value $C^1_{i,j}$ smaller or equals to the negotiated output resource at output i for provider j; the matching condition for the second output attribution sub process is to have a counter value $C^2_i$ smaller or equals to the output resource capacity at output i.

Figure 2:
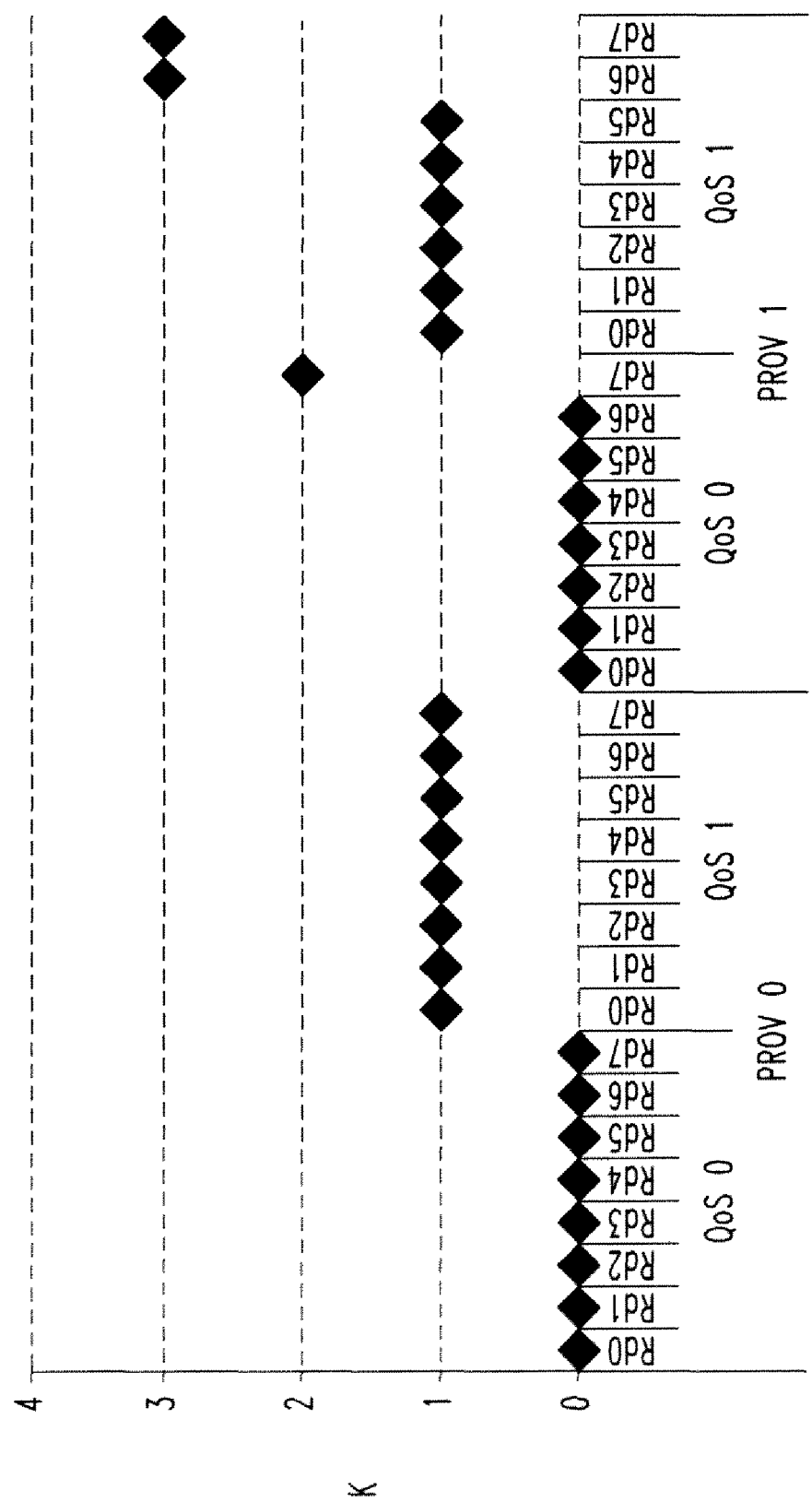
FIG. 2 illustrates an example of a diagram for the priority key attribution rules according to a simplified example.
Figures 3, 4:
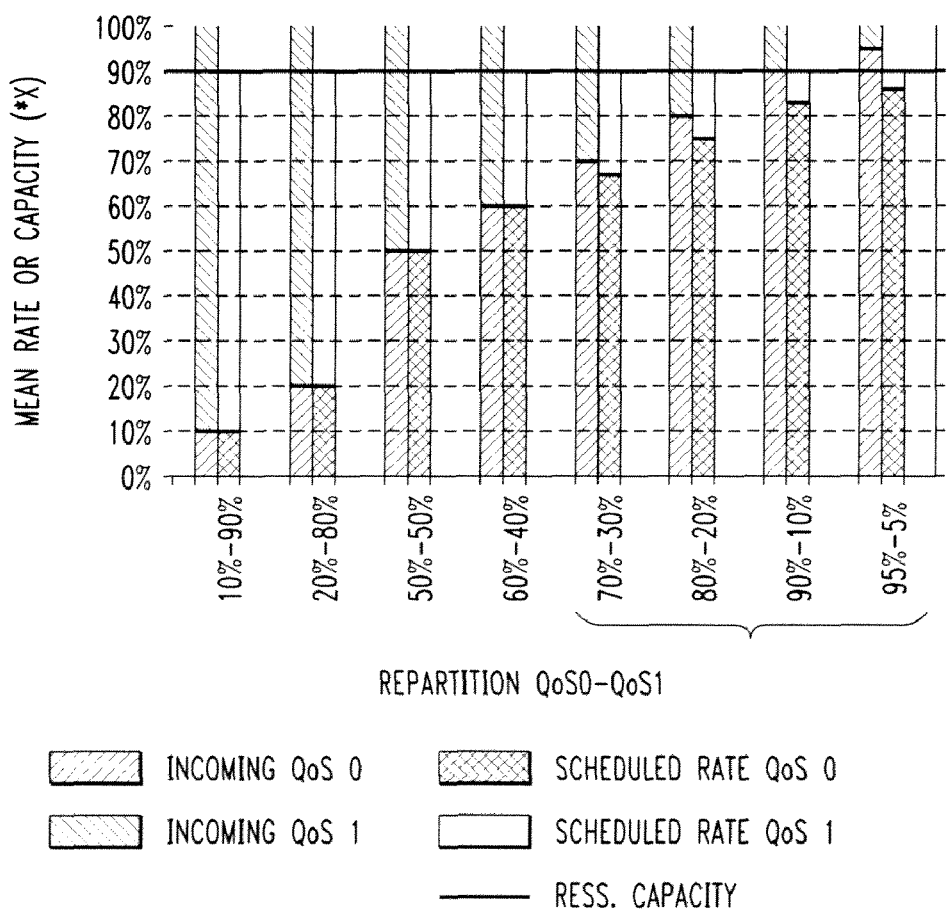
FIG. 3 illustrates the likelihood of each priority key value to be reached for the priority key attribution rules that may be used in the system of FIG. 2.
FIG. 4 illustrates a diagram of the scheduled rate per QoS versus the incoming rate per QoS for the priority key attribution rules that may be used in the system of FIG. 2.

FIG. 2 illustrates a simplified mapping table providing an example of fair and strict management of QoS respectively for packets from provider 1 and 0. In the fair case, low prioritized QoS can be scheduled even in case of important load of high prioritized QoS (see also FIG. 4). Example is defined for 2 levels of QoS and for two service providers. The random generator 34 provides a random parameter Rd, coded with 3 bits in the example (thus 8 possible Rd values). In this example with provider 1, for a QoS value of 0 and if Rd equals 0 to 6, K will be set at 0, else K is set at 2, for a QoS value of 1 and if Rd equals 0 to 5, K will be set at 1, else K is set at 3. Hence, when servicing K in a growing order as shown, ⅞ (87.5%) of the mean traffic with QoS 0 is served first then ⅝ (75%) of the mean traffic with QoS 1, then ⅛ (12.5%) of the mean traffic with QoS 0, and lastly ⅜ (25%) of the mean traffic with QoS 1. When assuming an output resource capacity X with a negotiated output resource capacity for the provider 1 of 90%*X, assuming also that the mean rates of QoS 0 (highest priority) and of QoS 1 are respectively 95%*X and 5%*X, then, the mean rates to be scheduled will be first ~83%*X for traffic with QoS 0 (=87.5%*95%*X in queue K=0), ~4%*X for traffic with QoS 1 (=75%*5%*X in queue K=1) ~12%*X for traffic with QoS 0 (=12.5%*95%*X in queue K=2) and finally ~1%*X for traffic with QoS 1 (=25%*5%*X in queue K=2). The first allocation step will fill the negotiated output resource up to the capacity of 90%*X, so the mean rate of scheduled traffic with QoS 0 is 86%*X (=83%*$X_{from\ K=0}$+3%*$X_{from\ K=2}$) and is ~4%*X for QoS 1. As it has been demonstrated, the mean rate of low prioritised QoS scheduled traffic is not null, so no unfair blocking situation occurs. This is illustrated in the 4 columns on the right of FIG. 4, where some QoS 1 packets are scheduled instead of QoS 0 packets, although the required hardware output resources capacity attributed to the service provider are insufficient.

The case of strict prioritisation, representative of simple Differentiated services solution driving to unfairness, can be illustrated with provider 0 (this case corresponds to the prior art). Under similar traffic and negotiated output resources conditions, the first allocation step gives a mean rate of scheduled traffic with QoS 0 of 90%*X (=90%*$X_{from\ K=0}$). From a statistical point of view, QoS 1 is rarely served and the mean rate of scheduled traffic with QoS 1 is close to 0, depending of the burstyness of the traffic.

Though such a packet scheduling system is particularly suitable for a satellite embedded packet switch, it is also applicable to terrestrial solutions.

The invention claimed is:

1. System for scheduling the attribution of hardware output resources to data packets handled by different service providers and to be transmitted, comprising:
   an extraction device adapted for extracting a Quality of Service parameter included in a packet header;
   a random value generator to generate a random value;
   a programmable key attribution device attributing a priority key to a packet depending on the Quality of Service parameter and on the generated random value, according to programmable rules;
   a scheduling device comprising a command generator generating packet switching commands in an order depending on the value of the priority key attributed to each packet header; and
   a switching device routing the packets towards hardware output resources in the order of the generated packet switching commands.

2. System for scheduling the attribution of hardware output resources according to claim 1,
   comprising means for determining a capacity overflow for each service provider; and
   wherein the scheduling device firstly generates packet output commands for packets for which a service provider capacity output overflow is not detected, and secondly generates packet output commands for the packets for which an overflow is detected in the limit of the hardware output resources.

3. System for scheduling the attribution of hardware output resources according to claim 1, wherein:
   the scheduling device comprises different queues related to different respective priority keys, a packet header sorter storing a packet header in the queue corresponding to its attributed priority key; and
   the command generator operates consecutive sub processes, each sub process scanning the packet queues in a programmable sequence and picking header packets out of the scanned queue depending on a matching condition that depends on the sub process operated.

4. System for scheduling the attribution of hardware output resources according to claim 3, wherein:
   said sub processes comprise a sub process generating packet output commands for packets for which a service provider capacity output overflow is not detected, and a sub process generating said packet output commands for the packets for which an overflow is detected in the limit of the hardware output resources.

5. System for scheduling the attribution of hardware output resources according to claim 3, wherein:
   said sub processes comprise a sub process generating packet output commands, a sub process generating packet dropping commands, a sub process generating packet buffering commands; and
   the switching device comprises a buffer memory storing the packets and a switch adapted to be connected to hardware output resources, the switching device routing the packet towards the hardware output resources when it receives the corresponding packet output command, deleting a packet from the buffer memory when it receives a related packet dropping command, and maintaining a packet in the buffer memory when it receives a related packet buffering command.

6. System for scheduling the attribution of hardware output resources according to claim 3, wherein said sub processes are repeated for each packet time slot.

7. System for scheduling the attribution of hardware output resources according to claim 1, wherein:
   the extraction device is adapted for extracting, from a packet header, characteristics chosen in the group constituted of the service provider identification, the bandwidth of the channel used for sending the packet, the packet size; the packet destination address, the packet origin address, the packet required arrival time, the available transmission bandwidth for the packet service provider, the data included in the packet and a multicast parameter; and
   the programmable key attribution device also attributes said priority key depending on said chosen characteristics.

8. System according to claim 1, wherein the key attribution device includes a random access memory storing the programmable rules.

9. Method for scheduling the attribution of hardware output resources belonging to a system, to data packets handled by different service providers and to be transmitted, comprising:
   extracting a Quality of Service parameter from a packet header;
   generating a random value;
   attributing a priority key to a packet depending on the Quality of Service parameter and on the generated random value, according to programming rules;
   generating packet switching commands in an order depending on the value of the priority key attributed to each packet header; and
   routing the packets towards hardware output resources in the order generated packet switching commands.

10. Method according to claim 9, comprising the steps of:
   further to the extraction of a service provider identification, detecting for each packet if there is a service provider capacity overflow;
   firstly routing the packets for which no service provider capacity overflow was detected towards hardware output resources; and
   secondly routing the packets for which an overflow was detected towards hardware output resources in the limit of these hardware output resources.

11. Method according to claim 9, wherein said steps are repeated for each packet time slot.

* * * * *